United States Patent
Kinsman et al.

(10) Patent No.: US 6,303,097 B1
(45) Date of Patent: Oct. 16, 2001

(54) PROCESS FOR THE PREPARATION OF METAL SULPHIDES

(75) Inventors: Barry Edward Kinsman, Poole/Dorset; Richard Hanney, Blandford Forum, both of (GB)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 08/379,600

(22) PCT Filed: May 25, 1994

(86) PCT No.: PCT/EP94/01706

§ 371 Date: Feb. 2, 1995

§ 102(e) Date: Feb. 2, 1995

(87) PCT Pub. No.: WO94/29217

PCT Pub. Date: Dec. 22, 1994

(30) Foreign Application Priority Data

Jun. 3, 1993 (EP) ................................................. 93108929

(51) Int. Cl.$^7$ ............................ C01B 17/20; C01B 17/43
(52) U.S. Cl. ..................... 423/561.1; 423/566.3; 423/443
(58) Field of Search .................... 423/444, 561.1, 423/566.1, 566.3, 443; 117/956, 957, 958

(56) References Cited

U.S. PATENT DOCUMENTS

| | | | | |
|---|---|---|---|---|
| 1,193,210 | * | 8/1916 | Walter | 423/444 |
| 3,009,781 | * | 11/1961 | Johnson et al. | 423/444 |
| 3,748,095 | * | 7/1973 | Henderson | 423/562 |
| 4,041,140 | | 8/1977 | Nitta et al. | 423/461.1 |
| 5,032,374 | * | 6/1991 | Pastor et al. | 423/566.1 |

FOREIGN PATENT DOCUMENTS

A 54 040 295  3/1979 (JP) .

OTHER PUBLICATIONS

E. D. Eastman et al. "Preparation and Properties of Refractory Cerium Sulfides", J. Amer. Chem. Soc., Vol. 72, pp. 2248–2250, May 1950.*

* cited by examiner

Primary Examiner—Steven P. Griffin
(74) Attorney, Agent, or Firm—Millen White Zelano & Branigan, P.C.

(57) ABSTRACT

A process for the preparation of metal sulphides includes reacting corresponding metal oxides at temperatures between 500 and 1500° C. in a stream of gaseous $CS_2$ characterized in that the $CS_2$ is generated from elementary carbon and gaseous $H_2S$ by reaction at temperatures between 900 and 1500° C. upstream of the metal oxide. The process furnishes metal sulphides of high purity, thus being of specific usefulness in optical glass materials, for, e.g., fiber optics.

15 Claims, 1 Drawing Sheet

2

PROCESS FOR THE PREPARATION OF METAL SULPHIDES

BACKGROUND OF THE INVENTION

The present invention relates to a process for the preparation of metal sulphides.

Metal sulphides find various uses in technical and scientific applications. For instance, several rare earth and other metal sulphides are of specific interest as materials or components in optical glasses for the manufacture of, e.g., optical fibers and active fiber amplifiers. In this field of application there is an increased demand of new materials useful for fiber optics with improved optical properties. Typical of such materials are, for example, the sulphides of Lanthanum ($La_2S_3$), Praseodymium ($Pr_2S_3$), Holmium ($Ho_2S_3$), Gallium ($Ga_2S_3$) and Germanium ($GeS_2$). One of the main requirements to be met for optical fiber applications, specifically for 1.3 µm fiber optic systems, is ultra high purity of the sulphides, as it is expected that an increase in purity of the sulphides could lead to a substantial increase in efficiency of the fiber optics.

Several methods for the preparation of metal sulphides are known which are based on the reaction of the metal or the metal oxide with sulphur, hydrogen sulphide or other sulphur containing reagents. For a review of methods for the preparation of rare earth metal sulphides, reference is made to Gmelin Handbook of Inorganic Chemistry, 8th Edition, Rare Earth Elements - C7, page 69–74, Springer Verlag, 1983. It is apparent that the methods reported there suffer from severe disadvantages, most of all limited applicability and ineffectiveness, and do not furnish products of high purity.

For instance, high temperature reaction of the metal with sulphur in a sealed silica tube works for a limited range of metals only, where the product sulphide is miscible with excess metal, permitting a continuous reaction of the elemental charge. The partial formation of an insoluble product sulphide, such as $La_2S_3$ may cause the reaction to cease and leads to rupture of the ampule and explosion.

High temperature reaction of the metal with hydrogen sulphide is similarly limited by the formation of insoluble surface sulphide which inhibits full progress of the reaction.

High temperature reaction of the oxide with hydrogen sulphide and/or sulphur vapour is effective with elements such as Group Ia metals only, but may leave a high level of several percent of unreacted oxide impurity. It is ineffective in the case of many rare earth oxides.

Moreover, many of the rare earth oxides require temperatures above 1300° C. in this type of reaction which is inconvenient for normal furnace systems.

Carbon disulphide vapor was reported to be a more effective sulphiding agent for several rare earth metal oxides. $CS_2$ may be supplied into the reaction system by bubbling an inert carrier gas through a bottle of $CS_2$ liquid and passing the gaseous mixture into the reactor tube containing the oxide and which is heated to temperatures at about 1000° C. This is an unpleasant and dangerous operation, since $CS_2$ is toxic and highly flammable.

In situ generation of $CS_2$ from sulphur and carbon in the reaction zone was also reported. Eastman et al., J. Amer. Chem. Soc, 72, 2248 (1950), reported the preparation of cerium sulphide from the dioxide by passing a stream of hydrogen sulphide over it in a carbon furnace at elevated temperatures. An intermediate formation of $CS_2$ is speculated.

SUMMARY OF THE INVENTION

In-house investigations on these methods now confirmed that $CS_2$ is a more effective sulphiding agent. To avoid the dangerous handling of $CS_2$, in situ generation from carbon and hydrogen sulfide has been studied. In the experiments the metal oxide was contained in a graphite boat which was eroded at elevated temperatures by the hydrogen sulphide in the immediate vicinity of the oxide. Analytical investigation of the products so formed showed, that the metal sulphides contain carbonaceous impurities and/or contamination with binder materials from the graphite.

It was, therefore, the task of the present invention to provide a process by which in a safe, simple and effective manner metal sulphides can be produced which are pure enough for the use in optical glass materials, specifically designated for fiber optics. It has been found out that these objects can be met by a process in which metal oxides are reacted at temperatures between 500 and 1500° C. in a stream of gaseous $CS_2$, characterized in that the $CS_2$ is generated from elementary carbon and gaseous $H_2S$ by reaction at temperatures between 900 and 1500° C. upstream of the metal oxide.

The object of the invention is therefore a process for the preparation of metal sulphides by reaction of the corresponding metal oxides at temperatures between 500 and 1500° C. in a stream of gaseous $CS_2$, characterized in that the $CS_2$ is generated from elementary carbon and gaseous $H_2S$ by reaction at temperatures between 900 and 1500° C. upstream of the metal oxide.

The process of the invention is based on the principle of in situ generation of $CS_2$ from elementary carbon in a stream of gaseous $H_2S$ at appropriate temperature, followed by the reaction of the so formed gaseous $CS_2$ with the metal oxide yielding the corresponding metal sulphide. Here, in contrast to known methods utilizing the same principle, the $CS_2$ is not generated in the intimate vicinity of the oxide but is formed at a separated location upstream of the oxide in a suitably designed reaction apparatus.

The main advantage of this method is that metal sulphides are obtained which are free of impurities and contaminants stemming from the carbon and which show a residual oxide content not exceeding 0.5% by weight. As a rule, the residual oxide content of sulphides obtained with the process of the invention lies within the region of 0.01–0.1% by weight. Thus, this process results in metal sulphides of extreme purity making them highly suitable as optical glass materials, specifically for optical fiber applications.

Further advantages are the easy and safe practicability and the broad applicability of the process, as practically any metal sulphide is accessible from the corresponding oxide.

The process is especially useful in cases where known processes are ineffective or even fail.

The process of the invention is preferably applicable to the preparation of the sulphides of Group IIa metals of the periodic system of the elements, especially the sulphides of Mg, Ca, Sr and Ba, of Group IIIa metals, especially of Al and Ga, of Group IVa metals, specifically of Si, Ge and Sn, of transition metals and rare earth metals. Most preferred is the preparation of the sulphides of La, Pr and Ho, namely $La_2S_3$, $Pr_2S_3$ and $Ho_2S_3$.

The process may be carried out in any suitably designed reaction apparatus which allows a separate placement of elementary carbon and metal oxide, an appropriate heating of both locations to reaction temperature, and a continuous feeding of gaseous $H_2S$ coming into contact with the carbon first.

In a preferred embodiment the reaction is carried out in a horizontally placed tube-like reactor in which in a first reaction zone a container is placed which is filled with pulverized elementary carbon and in a second reaction zone a container is placed which is filled with an appropriate amount of metal oxide, and where a stream of gaseous $H_2S$ is fed into the reactor, each reaction zone being heated to the necessary reaction temperature.

In the first reaction zone conversion of elementary carbon to gaseous $CS_2$ takes place when gaseous $H_2S$ is fed over the carbon charge at an appropriate temperature. The temperature should be held at least at 900° C.; 1500° C. appears to be the upper limit for reasons of practicability. Preferably, the conversion temperature is held in the region of 950–1000° C.

In the second reaction zone, the gaseous $CS_2$ which is generated in the first reaction zone reacts with the charge of metal oxide to form the desired metal sulphide. Suitable reaction temperatures may be chosen between 500° C. and 1500° C., depending on the nature and the specific requirements of the metal oxide. In most cases, reaction temperatures between 900 and 1000° C. are appropriate. Depending on the specific system, the reactivity of the oxide and the charge, one reaction run requires 6–48, preferably 12–24 hours reaction time under continuous $H_2S$ supply and heating for a complete conversion to the sulphide product.

The reaction equipment, such as reactor tube and containers, may be made from any material having a sufficient temperature stability and which does not undergo reactions with the oxide, the carbon or the sulphiding agents under the reaction conditions applied. Reaction systems made from high temperature stable glass ware, silica or ceramics are suitable. Preferably, the reactor tube is made from silica and the containers are boats of appropriate dimensions made from silica or aluminous porcelain. The reactor tube ideally is placed in one tube furnace which allows an independent fixing and control of two temperature zones in the reactor. Alternatively, a tube reactor of suitable length is placed in two separately operated furnaces, so defining the two required reaction zones. An inlet for $H_2S$ and $N_2$ as inert gas carrier is provided at one end of the tube; the other end is connected with the exhaust, preferably provided with means for scrubbing excess $H_2S$ and $CS_2$.

A boat filled with pulverized elementary carbon is placed in the first reaction zone of the tube reactor. Elementary carbon in the form of graphite or charcoal is applicable. The charge of metal oxide is placed in another boat in the second reaction zone. For an easy conversion, the oxide should be provided in pulverized form as well.

The layout of the equipment is of course dependent on the desired product output. For a construction which is able to deliver about 20–200 g of metal sulphide a tube reactor of about 1 m length with a diameter of about 50 to 70 mm has been found sufficient.

Figure 1:
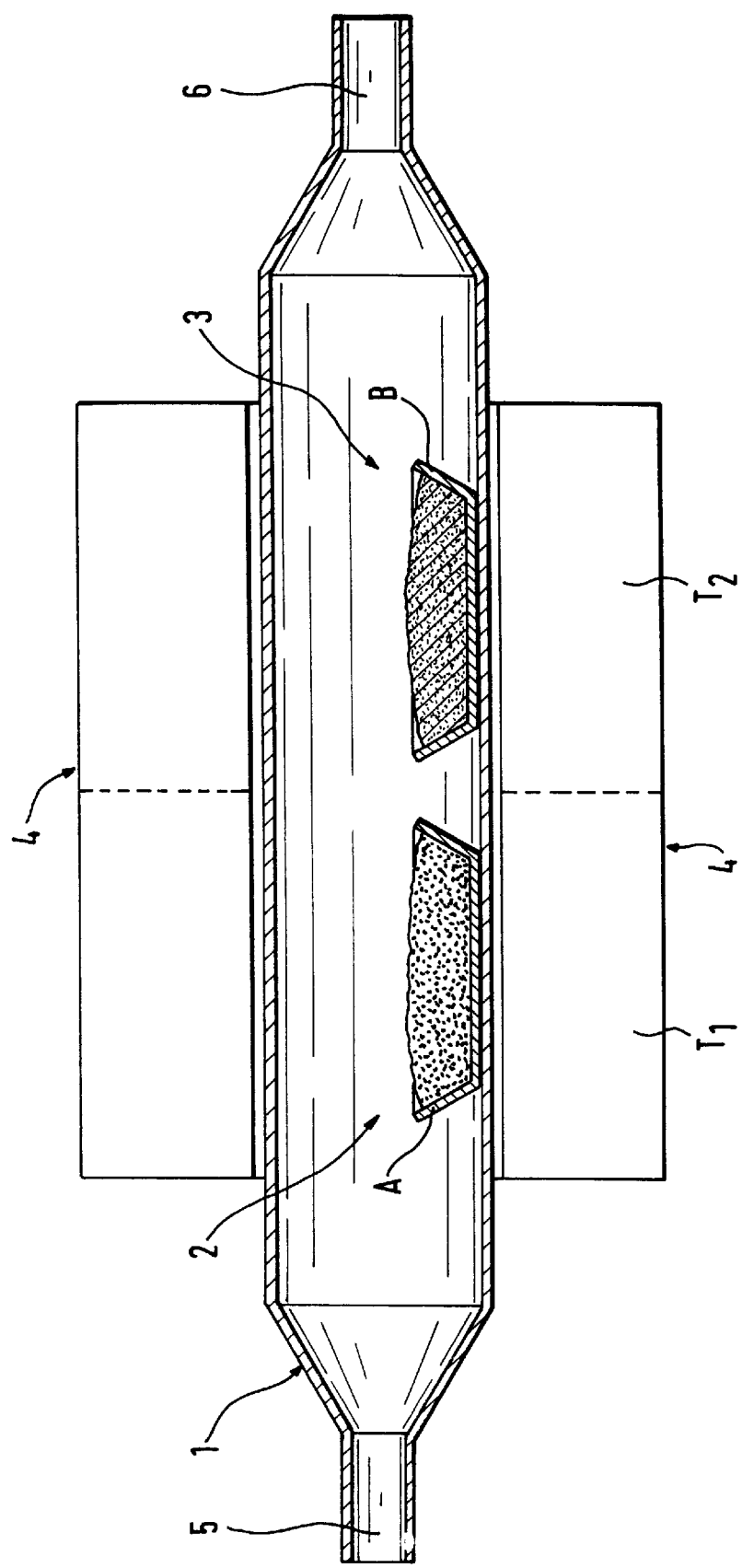
FIG. 1 shows a sketch of a reaction equipment used in the following examples.

(1) is a silica tube reactor of 1 m length and 50 mm diameter. (2) is the first reaction zone in which a boat (A) charged with pulverized elementary carbon is placed. (3) is the second reaction zone in which a boat (B) charged with pulverized metal oxide is placed. (4) is the furnace with two separately controlled temperature zones $T_1$ and $T_2$. $N_2$ and/or $H_2S$ is fed into the reactor at (5). Excess gas is led to scrubber and exhaust (6).

EXAMPLE 1

A: Aluminous porcelain boat containing 13.5 g activated charcoal.
$T_1$: 950° C.
B: Silica boat containing 41 g $Ho_2O_3$.
$T_2$: 990° C.

The reactor was brought to operating temperatures under a flow of $N_2$ (0.5l/min). $H_2S$ was then introduced (0.2l/min) and the $N_2$ shut off. Temperatures and gas flow were maintained for 48 hours, then the furnace was switched off and the reactor cooled over night in the flow of $H_2S$. The reactor was purged with $N_2$ after turning off the $H_2S$ and opened up.
Boat A contained 49 g holmium sulphide.
Ho content=77.5% (theory: 77.4%).
O content=0.1%
Boat B contained a small residue of charcoal.

EXAMPLE 2

A: Aluminous porcelain boat containing 20 g activated charcoal.
$T_1$: 950° C.
B: Silica boat containing 149 g $La_2O_3$.
$T_2$: 1000 °C.

The reactor was brought to operating temperature under a flow of $N_2$(0.4l/min). $H_2S$ was then introduced (0.2l/min). Temperatures and gas flow were maintained for 24 hours; then the furnace was switched off and the $H_2S$ turned off. The reactor was allowed to cool over night in the remaining flow of $N_2$. The reactor was opened.
Boat A contained 158 g lanthanum sulphide.
La content=74.0% (theory: 74.3%)
S content=25.5% (theory: 25.7%)
O content=0.27%
Boat B contained 2.6 g residual charcoal.

What is claimed is:

1. A process for the preparation of a metal sulphide which comprises reacting an elementary carbon source and gaseous $H_2S$ at a temperature of 900 to 1500° C. to produce gaseous $CS_2$ in a first reaction zone, passing the gaseous product from the first reaction zone, containing $CS_2$ prepared in situ and unreacted $H_2S$, directly to a second reaction zone, which is separate from the first reaction zone, containing a metal oxide corresponding to the metal sulphide and reacting the metal oxide with the gaseous $CS_2$ at a temperature of from 500 to 1500° C. to prepare the metal sulphide.

2. The process of claim 1, wherein the metal sulphide is prepared substantially free of carbonaceous impurities.

3. The process of claim 1, wherein the metal sulphide has a residual oxide content less than or equal to 0.5% by weight.

4. The process of claim 1, wherein the metal sulphide has a residual oxide content of 0.01 to 0.1% by weight.

5. The process of claim 1, wherein the temperatures of the first and second reaction zones are separately controllable.

6. The process of claim 1, wherein the gaseous $H_2S$ is provided in the first reaction zone together with an inert gas.

7. The process of claim 1, wherein the first and second reaction zones are incorporated within a horizontal tube reactor, the first reaction zone having a container with the elementary carbon source and the second reaction zone having a container with the metal oxide, and the gaseous $H_2S$ is fed into the tube reactor.

8. The process of claim 7, wherein the elementary carbon source and the metal oxide are both in pulverized form.

9. The process of claim 7, wherein the elementary carbon source is graphite or charcoal.

10. The process of claim 7, wherein the container in the second reaction zone is made of silica or aluminous porcelain.

11. The process of claim 1, wherein the elementary carbon source is graphite or charcoal.

12. The process of claim 1, wherein the metal sulphide is a sulphide of Mg, Ca, Sr, Ba, Al, Ga, Si, Ge, Sn, a transition metal or a rare earth metal.

13. The process of claim 1, wherein the metal sulphide is a sulphide of La, Pr or Ho.

14. The process of claim 1, wherein the reaction of the elementary carbon source and gaseous $H_2S$ is at a temperature of 950 to 1000° C.

15. The process of claim 1, wherein the reaction of the metal oxide and gaseous $CS_2$ is at a temperature of 900 to 1000° C.

* * * * *